(12) United States Patent
Liu et al.

(10) Patent No.: US 8,612,389 B2
(45) Date of Patent: Dec. 17, 2013

(54) METHOD AND APPARATUS FOR DISCOVERING APPLICATION CONFIGURATION FILES IN A SYSTEM

(75) Inventors: Tian Cheng Liu, Beijing (CN); Qiming Teng, Beijing (CN); Jie Qiu, Beijing (CN); Xiao Zhong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 12/711,582

(22) Filed: Feb. 24, 2010

(65) Prior Publication Data

US 2010/0223306 A1    Sep. 2, 2010

(30) Foreign Application Priority Data

Feb. 27, 2009   (CN) .......................... 2009 1 0126105

(51) Int. Cl.
*G06F 17/30* (2006.01)
(52) U.S. Cl.
USPC ......................................................... 707/634
(58) Field of Classification Search
USPC .......... 707/634; 713/100; 710/8, 19; 717/121
See application file for complete search history.

(56) References Cited

U.S. PATENT DOCUMENTS

| | | | |
|---|---|---|---|
| 6,721,880 B1 * | 4/2004 | Pike ................................... | 713/1 |
| 6,748,429 B1 * | 6/2004 | Talluri et al. ................... | 709/221 |
| 7,783,733 B1 * | 8/2010 | Yip et al. ........................ | 709/223 |
| 2003/0101245 A1 * | 5/2003 | Srinivasan et al. ............ | 709/221 |
| 2004/0010473 A1 | 1/2004 | Hsu et al. | |
| 2006/0036570 A1 * | 2/2006 | Schaefer et al. .................. | 707/1 |
| 2010/0111035 A1 * | 5/2010 | Eskicioglu et al. ........... | 370/331 |

FOREIGN PATENT DOCUMENTS

CN           101048735         10/2007

OTHER PUBLICATIONS

Schilit, Bill, Norman Adams, and Roy Want. "Context-aware computing applications." Mobile Computing Systems and Applications, 1994. WMCSA 1994. First Workshop on. IEEE, 1994.*
Su, Ya-Yunn, Mona Attariyan, and Jason Flinn. "AutoBash: improving configuration management with operating system causality analysis." ACM SIGOPS Operating Systems Review 41.6 (2007): 237-250.*

* cited by examiner

*Primary Examiner* — Usmaan Saeed
*Assistant Examiner* — Nan Hutton
(74) *Attorney, Agent, or Firm* — Jon A. Gibbons; Fleit Gibbons Gutman Bongini & Bianco PL

(57) ABSTRACT

A method and apparatus for discovering application configuration files in a system. The method includes the steps of: obtaining a process identifier of an application in concern; comparing the obtained process identifier with a process identifier of a process for operating configuration files in the system; and determining configuration files to be the configuration files of the application in concern if the obtained process identifier is identical to the process identifier of a process for operating the configuration files in the system. Application configuration files can be automatically discovered and thereby monitored, such that the change of the application configuration files can be effectively and accurately detected, so as to facilitate a user to perform various subsequent operations.

20 Claims, 10 Drawing Sheets

METHOD AND APPARATUS FOR DISCOVERING APPLICATION CONFIGURATION FILES IN A SYSTEM

CROSS-REFERENCE TO RELATED APPLICATION

This application claims priority under 35 U.S.C. §119 from Chinese Patent Application No. 200910126105.0 filed Feb. 27, 2009, the entire contents of which are incorporated by reference herein.

BACKGROUND OF THE INVENTION

1. Field of the Invention

The present invention relates to application configuration files. More particularly, the present invention relates to a method and apparatus for discovering application configuration files in a system.

2. Description of the Related Art

Application configuration files are a kind of file dedicated to recording and setting application-related configurations. Some applications only read concerned configuration files when they are launched, while other applications re-read concerned configuration files periodically or under certain circumstances. Then, they act upon the currently launched application. Currently, the application configuration files mainly include the following types: a text file, that is, the application configuration files are compiled in a pure text form, and runtime dependent static/dynamic loading lib, that is, a subscriber dynamic link library (dll). As a change of dynamic link library also affects the corresponding application configuration files, the dynamic link library is also categorized to this kind of configuration file. There is also another configuration file type, that is, Windows operating system specific registry table.

Typically, a change in the above various types of configuration files of a number of applications in a computing apparatus will affect the runtime reliability, availability and scalability of the applications. Error modifications to some critical configuration files may seriously threaten operation of the application and thereby may cause unrecoverable failures. Thus, the user should monitor the runtime application, particularly monitor whether the application configuration files have been changed, so as to detect a change of such configuration files as soon as possible. Thereby, if the change may potentially affect or has affected the reliability, availability and scalability of the application, a change of the application configuration files can be recorded timely and handled correspondingly, so as to eliminate the potential or existing impact.

However, before real-time monitoring of the operations of configuring the application configuration files and causing changes to the original application configurations, it is a very difficult task to automatically retrieve the application configuration files. Typically, the application configuration files are considerable in types and quantity, scattered at different locations in different systems. Therefore, it is often impossible to automatically find the configuration files. Moreover, though it is a very common operation to configure an application, when configuring a considerable number of applications, the data volume formed by the configuration operation will be enormous. When monitoring such an enormous data volume, it is highly demanding on the processing capability, computing capability and storing capability of the system running the operation, which will undoubtedly increase the cost of monitoring change of the application configuration.

The existing solutions for monitoring the application configuration files can be classified into multiple types. One type is monitoring changes of all configuration files of the whole system, namely all configuration files in the system are regarded as being related to the concerned application. Once error occurs to the application running, the configuration files to which change occurs in all configuration files can be checked for error recovery, but such monitoring costs considerably. Another kind is to monitor a specific configuration file, namely retrieving all configuration files related to the application. The user has to grab and analyze all configuration files of the application manually beforehand, which undoubtedly increases the user's workload.

Thus, a method and apparatus are needed for automatically discovering runtime application configuration files to thereby monitor the configuration files, so as to exactly determine whether the configuration files are changed. It should be noted that in the present invention, the term "configuration files" should be interpreted in the broadest sense, that is, all files affecting the running and operation of an application in a system shall be regarded as the configuration files of the application within the spirit and scope of the present invention.

SUMMARY OF THE INVENTION

The present invention provides a method and apparatus for automatically discovering application configuration files, and after the configuration files are automatically found, further efficiently and accurately finding changes of the application configuration files through monitoring the application configuration files.

According to one aspect of the present invention, a method for discovering application configuration files in a system is provided. The method includes the following steps: obtaining a process identifier of an application in concern; comparing the obtained process identifier with a process identifier of a process for operating the configuration files in the system; and determining the configuration files to be the configuration files of the application in concern if the obtained process identifier to be identical to the process identifier of a process for operating the configuration files in the system.

According to another aspect of the present invention, an apparatus for discovering application configuration files in a system is provided. The apparatus includes: obtaining means for obtaining a process identifier of an application in concern; comparing means for comparing the obtained process identifier with a process identifier of a process for operating the configuration files in the system; and determining means for determining the configuration files to be the configuration files of the application in concern if the obtained process identifier is identical to the process identifier of a process for operating the configuration files in the system.

Through the method and apparatus of the present invention for searching application configuration files in a system, the application configuration files can be continuously and automatically found from the time of launching the application to the current time. Thereby, it can track the operations of the application reading the configuration files to further accurately detect changes of the configuration files of the running application, so as to facilitate the user to quickly recover from the abnormal running of the application caused by the change of the configuration files.

DESCRIPTION OF THE PREFERRED EMBODIMENTS

Figure 1A:
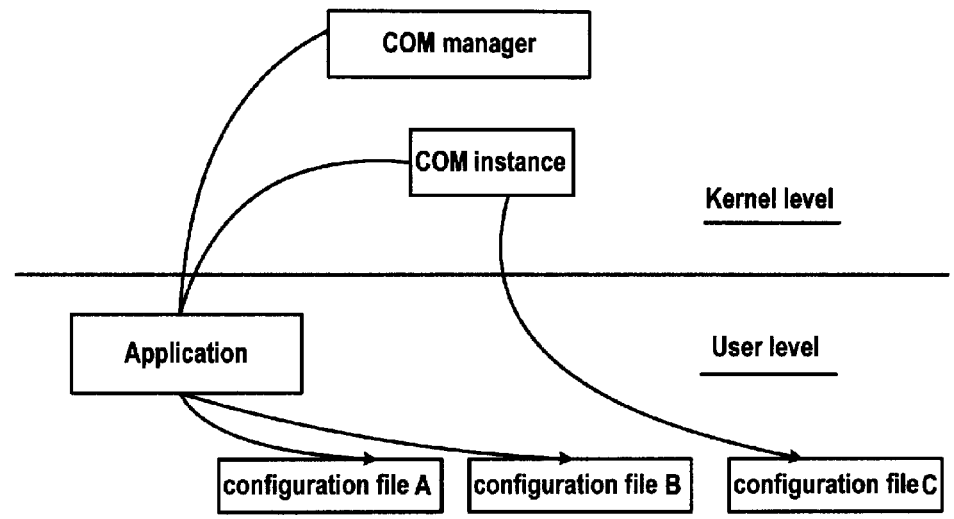
FIG. 1a shows a diagram of the relationships between applications due to configuration files according to an embodiment of the present invention.

As the present invention is further described, the present invention will become more apparent and easier to understand, taken in conjunction with the accompanying drawings. In all the figures, like reference numerals designate the same, similar, or corresponding features or functions throughout the drawings. Hereinafter, the preferred embodiments of the present invention will be described in detail with reference to the accompanying drawings.

FIG. 1a schematically shows a diagram of the relationships between applications due to configuration files according to an embodiment of the present invention. Windows OS is taken as an example in the figure. As is known to those skilled in the art, multiple COM components under the management of a COM manager are present in the Windows OS, that is, the COM instances shown in the figure (which can be in the kernel level or the user level, and for the purpose of illustration, only one COM instance in the kernel level is shown in the figure). The COM instances are additional entities to be scheduled by the operation system. In the actual running systems, an application (in the user level) may call and use a plurality of COM components. As shown in the figure, running of the application is directly related to its configuration files A and B, whereas running of the COM instances is dependent on its own configuration file C.

If the application does not use the COM components, then in a most basic embodiment of the present invention, only the configuration files A and B, which are directly related to the application itself, are concerned. The application-related configuration files are located through monitoring the access of the application process to the files. The basic embodiment is enough to automatically discover the application configuration files.

However, in a more common scenario than what is shown in FIG. 1a, the change of the configuration file C will affect the actual running of the COM instance. When the application calls the COM instances, the configuration files of the changed COM instance will be likely to affect running of the application. Thus, in the most basic embodiment the concern on the COM instance configuration file C may be neglected, namely the change of the configuration file indirectly related to the application is neglected. In a further improvement on the basic embodiment, not only the change of the configuration files directly relevant to the application (for example configuration files A and B in FIG. 1a) should be tracked, but also the configuration files (for example configuration file C in FIG. 1a) indirectly relevant to the application. Thereby, the monitoring of the change of the application configurations is implemented in an all-around manner.

Though the figure describes exemplarily with the Windows OS as an example, under the teaching of the present invention, those skilled in the art can appreciate that in the case of Linux OS the same tracking can occur. By similarly obtaining the process identifiers (PID) of other applications directly relevant to the application in concern by an inter-process communication mechanism, the configuration files directly relevant to the application (namely the configuration files directly relevant to the runtime application) can be tracked. Likewise, the configuration files relevant to various service processes or threads relevant to the runtime application (namely various configuration files indirectly relevant to the runtime application) are tracked.

Figure 1B:
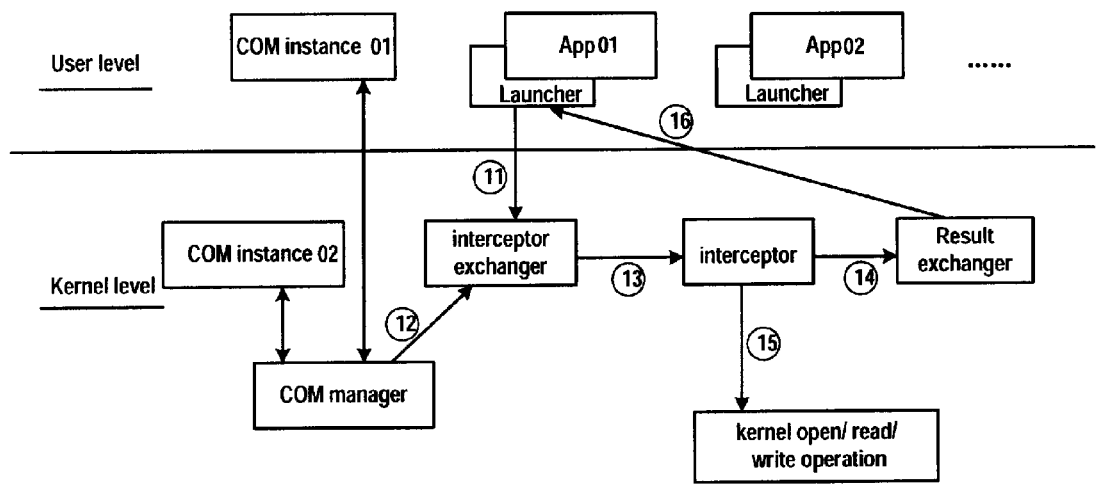
FIG. 1b shows an operation architecture diagram of a tracker for automatically discovering a configuration file list (CFL) of the application configuration files according to an embodiment of the present invention.

FIG. 1b schematically shows an operation architecture diagram of a tracker for automatically discovering a configuration file list (CFL) of the application configuration files according to an embodiment of the present invention. As shown in the figure, the applications App01, App02 and COM instance 01 are in the user level, whereas the COM instance 02, COM manager, Interceptor exchanger, Interceptor and result exchanger are in the kernel level. It should be noted that though those skilled in the art know the COM instances (components) and the COM manager as shown in the figure are specific to Windows OS, the description about both here is only exemplary. It does not constitute any limitation to the operation of the present embodiment. How the method of the present invention is implemented on the Windows OS will be described in further detail.

Before the start of the operation, a Launcher module should be installed to the application App01 so as to assist the launching of the application App01. When the application App01 is actually launched, the Launcher module temporarily interrupts launching the application App01. Subsequently, it obtains a PID and/or TID (thread identifier) assigned by the system to the application.

At step 11, the Launcher module launches the Interceptor exchanger in the kernel level and registers the PID/TID of the application to the Interceptor exchanger.

At step 12, the COM manager, for recording which processes use which COM instances, registers the recorded PID and/or TID of the COM instance 01 and COM instance 02 used by App01 to the Interceptor exchanger. As described above, the COM instance 01 and the COM instance 02 may further call other COMs. The COM manager also registers the PID and/or TID of the COM instance further used by the COM instance 01 and COM instance 02 to the Interceptor exchanger until the PID and/or TID of the application App01 per se, the PID and/or TID of the COM instance directly used by the App01, and if any, the PID and/or TID of the COM instance indirectly used by App01, are all registered to the Interceptor exchanger.

Though the COM instance 01 exemplarily shown in the figure is in the user level and the COM instance 02 is in the kernel level, under the teaching of the present invention, those skilled in the art can appreciate that it is trivial to explain the principle of the present invention regardless of whether each COM instance is in the user level or in the kernel level.

Though the COM manager in the Windows OS is taken as an example here to record the processes (that is, COM instances 01 and 02) relevant to the application App01, the COM instances are only a process manner specific to the Windows OS. The essence of COM instances is process. No matter whether it is in Windows or in another operation platform (for example Unix or Linux), the Interceptor exchanger can directly record the PID of the process relevant to the application App01. For example, if the application process communicates with a certain process A, the PID of process A is just the PID relevant to the application App01. If process A further communicates with process B, then the PID of process B is also the PID relevant to the application App01. The communication here requires the broadest interpretation. That is, as long as there is a relevance relationship between two processes, for example they share the same document, have pipes, exchange data through messages, and have call relationship, it is deemed as a communication between two processes.

It is found that the communication between two processes assumes various manners. For example, by intercepting the process creation operation (ftok), the PIDs of all sub-processes created by the process can be obtained, and it is deemed that communication exists between the process and its sub-processes. Another example is the scenario that the process communicates through a named pipe and a memory mapping (mmap). As both of the communications access a shared area with a file descriptor as the path, interception can be performed through file open operation (sys_open). If it is found that two processes open the same file, it is deemed that communication exists between the two processes. Another example is the scenario that processes communicate through shared memory (IPC shared memory region). Interception can be performed to the ftok function because the processes obtain a key through a ftok function to access the shared memory. If it is found that the key values obtained by the two processes calling the ftok are identical, it is deemed that communication exists between the two processes.

For the sake of flexibility, a communication distance threshold can be set. Communication distance indicates the degree of relevance between other processes and the application process. For the example mentioned above, process A directly communicates with the application process. Thus, the communication distance is 0. Process B further communicates with process A but does not communicate with the application process. Thus, the communication distance between process B and process A is 0, whereas the communication distance between process B and the application process is 1. By setting the communication distance threshold, it is enabled that only the PID of the process, whose communication distance from the application process is less than the threshold, is registered to the Interceptor exchanger. For the example mentioned above, given that the communication distance threshold is set as 1, only the PID of the application process and the PID of process A are registered to the Interceptor exchanger. Given that the communication distance threshold is set as 0, only the PID of the application process is registered to the Interceptor exchanger.

At step 13, the Interceptor exchanger feeds the collected data of PID (which can be implemented as a to-be-monitored application PID list) related to the application App01 into the Interceptor. Next, the Interceptor introduced into the present embodiment will intercept operations such as the open operation, read operation and write operation to configure files executed by all application processes or threads in the system. Then, the Interceptor checks whether these application PIDs or TIDs are recorded in the monitor list. If the PIDs or TIDs of these threads are present in the monitor list, namely they are PIDs or TIDs of the applications in the user's concern, then the Interceptor will retrieve relevant information of the configuration files to be operated by these processes or threads. For example, it will retrieve file names of the configuration files or various information capable of designating the configuration files, namely to determine these configuration files to be the configuration files of the application in concern.

At step 14, the Interceptor stores the extracted relevant information of the configuration files in a result exchanger, for example the information that may be implemented as a list of configuration file names. At step 15, the Interceptor will call the kernel application program interface (API) to execute the open operation, read operation or write operation of the actual configuration files of the process or thread. At step 16, the Launcher module can periodically extract the configuration file-related information data from the result exchanger, and erase the configuration file-related information data (for example the data of the list of configuration file names) in the result exchanger. It can be seen that the configuration file-related information data in the result exchanger changes dynamically with the application running in the system. It should be noted that the above TID is not necessary in case that the PID is known, because only in the case of unknown PID, is the PID of the application obtained through the TID. In the present application document, PID and TID are not specifically distinguishable, but are collectively called a process identifier. For the sake of simplicity, the present application document does not specifically distinguish an application from the runtime process of the application. By the above operations of the CFL tracker, the configuration file list of the application in the user's concern is automatically obtained.

Here, it should be noted that though the present invention uses the application TID or PID to identify the application, those skilled in the art would appreciate that use of the TID or PID is only for exemplary purposes, not for limitation. Any suitable identifier capable of identifying the application is allowed within the spirit and scope of the present invention. Further, the Launcher module and the Interceptor in the present embodiment is also only for exemplary purpose, not for limitation. Under the teaching of the present invention, those skilled in the art can adopt any other suitable means to realize the functions of the two, including other modules or functions with the same function.

Figure 2:
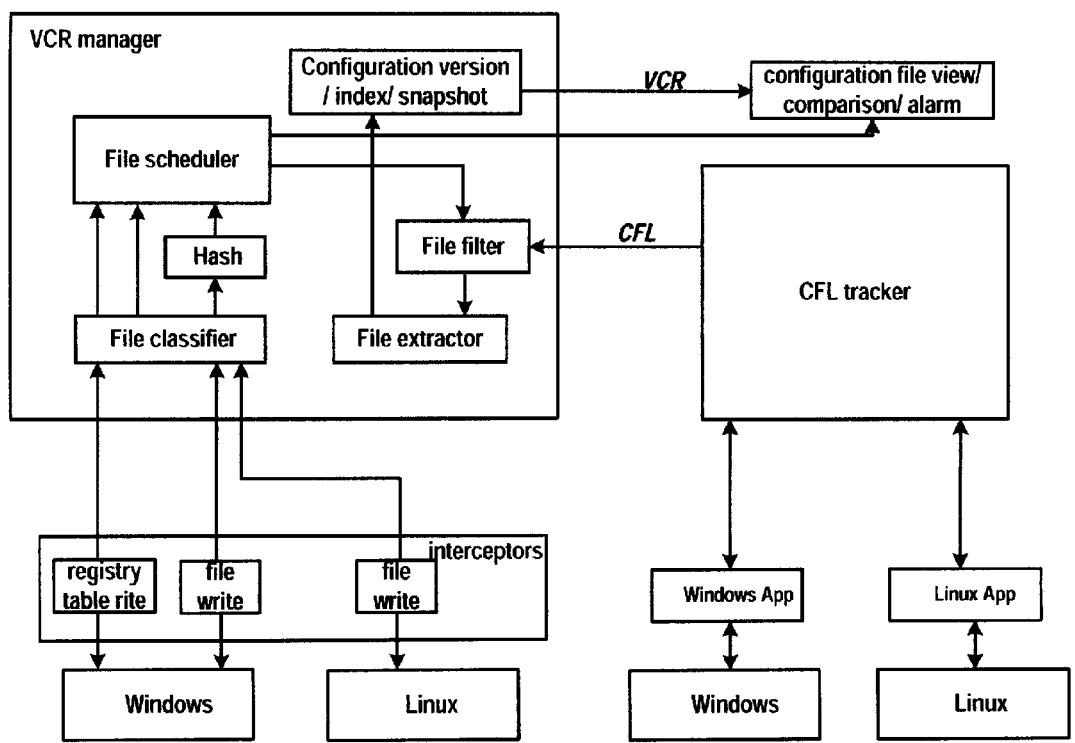
FIG. 2 shows a system architecture diagram according to an embodiment of the present invention.

FIG. 2 schematically shows a system architecture diagram according to an embodiment of the present invention. As shown in the figure, the system includes a version control repository (VCR) manager and a CFL tracker. The VCR manager is for monitoring all configuration files in the system and recording their changes. The CFL tracker is for searching the list of configuration files of the application in the system in the user's concern. Specifically, as shown in the middle left part of the figure, the Interceptor in the kernel level in the operating system (for example the Windows or Linux as shown in the figure) monitors the write operation of the application to all files (including the configuration files affecting the application running within the scope of the present invention) in the operating system. Upon occurrence of such write operation, the Interceptor intercepts the write operation action of the application (that is, the write operation event), thereby to determine which configuration files are subject to the write operation by the application, and how to execute this write operation.

The Interceptor submits the found configuration files to be subject to write operation to the VCR manager. In the VCR manager, a file classifier classifies the found configuration files, for example, classifying the found configuration files into binary files (including dll files), text files, and registry table files. If the binary files are considerable while the classes are relatively less, a Hash is optionally added in the present invention, for hash mapping these binary files, so as to rearrange these files to obtain a more effective classification. A file scheduler uses the process or thread operation to schedule the classified configuration files to be thereafter fed into a file filter. In the file filter, the classified configuration files are matched (that is, compared) with the configuration file list generated in the CFL tracker. If the changed configuration files are not present in the list, namely the configuration files subject to write operation in the system are not the application configuration files in the user's concern, no processing is performed on the change of the configuration files. If the changed configuration files are in this list, namely the changed configuration files are in the user's concern, the file extractor extracts the changed configuration files to be thereafter fed into the configuration version/index/snapshot modules, for performing further processing. For example, further processing includes recording the version number of the configuration files or backing them up, where the operation can be incremental or mass. Alternatively, the VCR manager feeds change of the configuration files back to the user, for example providing configuration changes or comparative view to the user through the graphic user interface (GUI) or directly warning or alarming the user.

Figure 3:
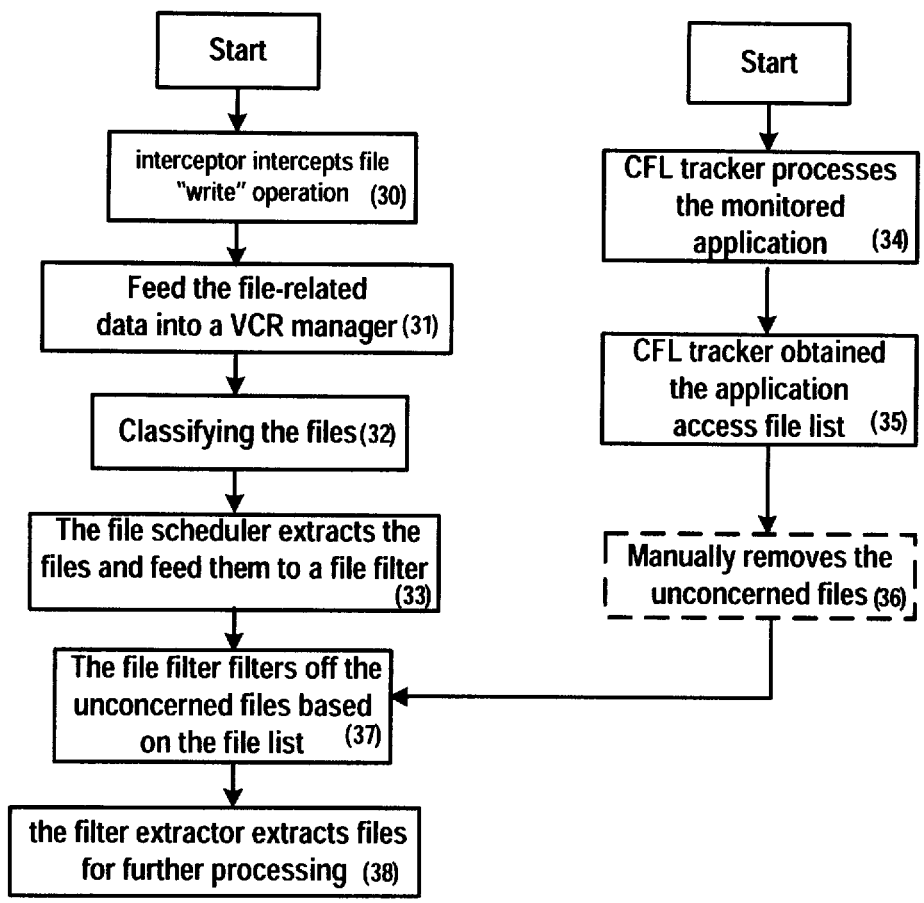
FIG. 3 shows a system operation flow diagram according to an embodiment of the present invention.

FIG. 3 schematically shows a system operation flow diagram according to an embodiment of the present invention. In the system operation flow diagram, the left part of the flow diagram shows a VCR manager operation flow in the system architecture diagram. The right part of the flow diagram shows the operation flow of the CFL tracker in the system architecture diagram. Here, the operation flow related to the VCR manager is described. As mentioned previously, at step 30, Interceptor intercepts the configuration file "write operation" executed by all applications in the system. Upon a successful interception, at step 31, relevant data of the configuration files subject to the write operation related to the applications are submitted to the VCR manager, where the relevant data, for example, may include user name, full path of the file (including the registry table file), time stamp (the time point of the current operation). Submitting the data to the VCR manager can be implemented by a new thread, a background process (or thread) or another process. The flow proceeds to the step 32, where classifying the relevant file types occurs, for example the previously mentioned text file, binary text (including dll text), and registry table file. At step 33, the text scheduler schedules tasks of extracting the file data to thereby feed the file-related information into a file filter. At this time the operation flow enters into the match processing (that is, the processing at step 37 as described below).

In order to better understand the operation flow of the whole system, now the operation flow of the CFL tracker at the right side of the system architecture is described. The CFL will only be described briefly because the operation procedures of the CFL tracker were described previously in detail with reference to FIG. 1. At step 34, the CFL tracker processes the monitored application, including using the Launcher module to launch the application to be monitored (that is, the application in the user's concern). The Interceptor exchanger, Interceptor and result exchanger implement the operations that were described in detail with reference to FIG. 1. At step 35, after implementing all operations at step 34, the CFL obtains the configuration file list of all to-be-executed operations (for example open operation, read operation and write operation) related to the application in concern.

Alternatively at step 36, the user can manually remove the unconcerned configuration files, for example files like logs. Though these kinds of files are subject to write operation by the application, they have no serious influence on the application running. At step 37, the CFL tracker feeds the obtained configuration file list into the file filter in the VCR manager, where the file filter performs a match operation to filter off the configuration files not in the user's concern. The match operation is implemented by, for example, filtering path, filtering file or filtering file by means of the named mode. The flow proceeds to step 38, at which the file extractor extracts the configuration files in the file list filtered by the file filter for further processing. Preferably, it can perform version control processing to the obtained configuration files, for example performing version management operation to the matched text file, binary file with an abstract and hash mapped registry table file. Alternatively, the user can be notified or alarmed with regard to details relating to the above configuration file changes, for example notifying or alarming the user through graphical interfaces such as a configuration file change history view, and a configuration file comparison view.

Figure 4:
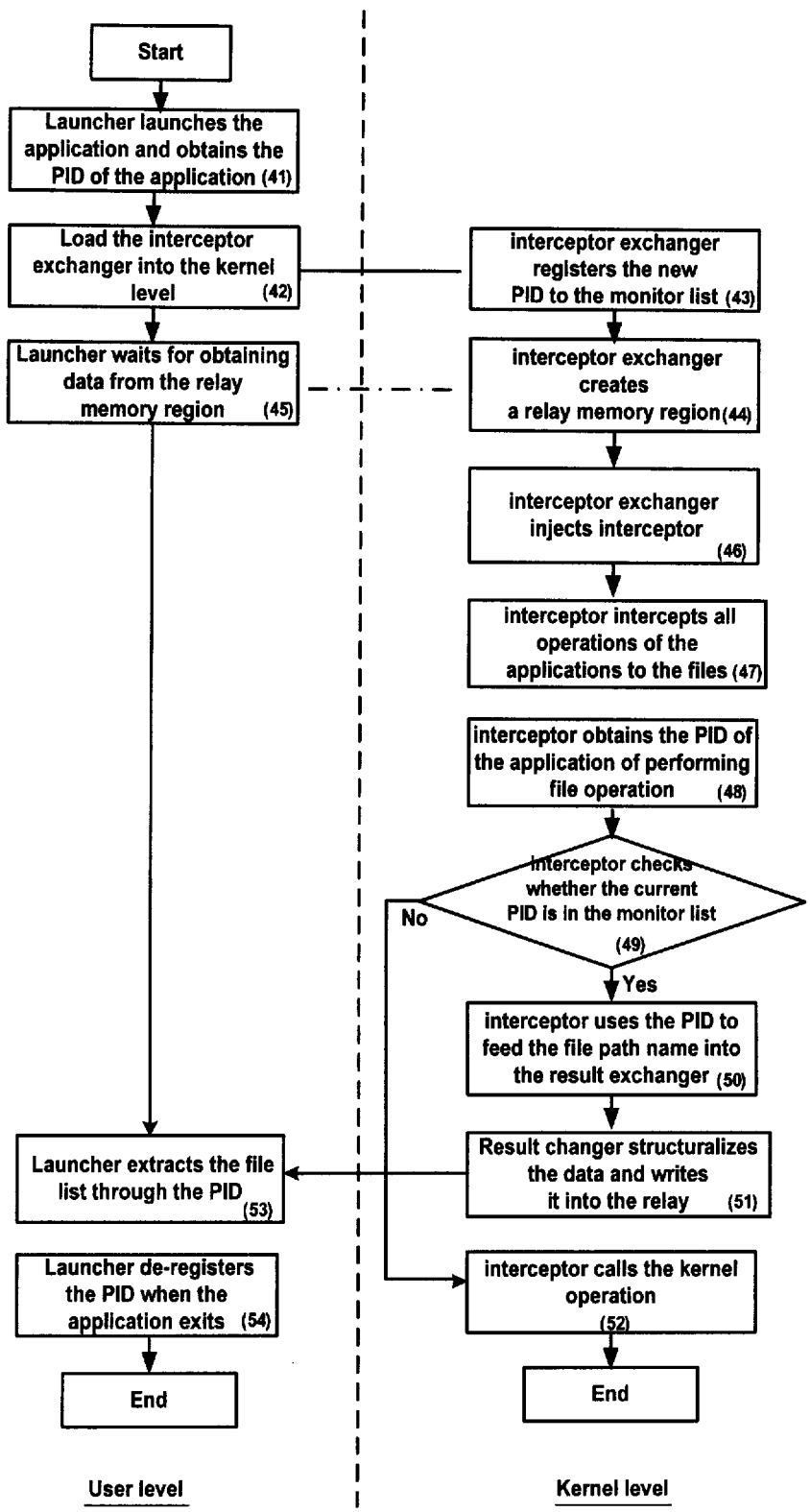
FIG. 4 shows a flow diagram of a CFL tracker performing operation on Linux OS according to an embodiment of the present invention.

FIG. 4 schematically shows a flow diagram of a CFL tracker performing operation on Linux OS according to an embodiment of the present invention. To better understand the present invention, the operation is divided into an operation flow in the user level and an operation flow in the kernel level. At step 41 in the user level at the left side, the application is launched by the Launcher module. After using the Launcher module to start the application, the PID of the application is correspondingly obtained and made to keep waiting (that is, interrupting the application running). At step 42, the Launcher module triggers the Interceptor exchanger, namely loading the Interceptor exchanger as a module in the kernel level. The loading operation is only required to perform when the Interceptor exchanger is used for the first time, namely if the Interceptor exchanger has been loaded in the previous operation, it has already been in the kernel level. In the kernel level, at step 43, the Interceptor exchanger registers the PID of the process related to the application process to the monitor list. The flow proceeds to step 44, at which the Interceptor exchanger creates a relay memory under a certain path of the kernel level, the relay memory being dedicated to storing the data exchanged between the result exchanger and the Launcher module, that is, the configuration file name list data related to the application to be run. The Launcher module, after the Interceptor exchanger creates the relay memory, will use the poll ( ) function to wait here for obtaining the data, as shown at step 45 on the left side flow diagram.

At step 46, the Interceptor exchanger uses the jProbe or Kprobe present in the Linux platform to inject the Interceptor. Thereby, at step 47, the injected Interceptor intercepts the open, read or write operation of all active applications to the configuration files. At step 48, the Interceptor points to the data structure of the current process by a current pointer in the data structure saving the PID of the application. Thereby, the Interceptor obtains the PID of the application through the current pointer. At step 49, the Interceptor compares each PID currently obtained with the PIDs in the previous monitor list. If the PIDs currently obtained by the Interceptor are present in the monitor list, then at step 50, the Interceptor obtains the PIDs and the file path names (that is, the configuration files subject to the open, read and write operations performed by the processes) and feed the data into a result exchanger. At step 51, the result exchanger structuralizes the data (encapsulation), and writes the structuralized data into a relay memory.

At step 52, the Interceptor calls kernel operations to perform the open, read or write operations of the current application to the configuration files. At step 49, if the Interceptor, after comparing the currently obtained PIDs with the PIDs in the previous monitor list, finds that the PIDs are not in the required monitor list, that is, not an operation performed by the application in the user's concern, then the flow directly proceeds to step 52, where the Interceptor calls the kernel operations to perform the open, read and write operations of the application to the configuration files. At step 53, at the left side of the flow diagram, the Launcher module extracts the data written by the result exchanger from the relay memory through the PIDs, that is, the configuration file list to be operated. After the extraction, alternatively the API (application program interface) of the relay notifies the kernel that the data in the relay will be cleared. At step 54, the Launcher module de-registers the PID of the application when the application exits.

Figure 5:
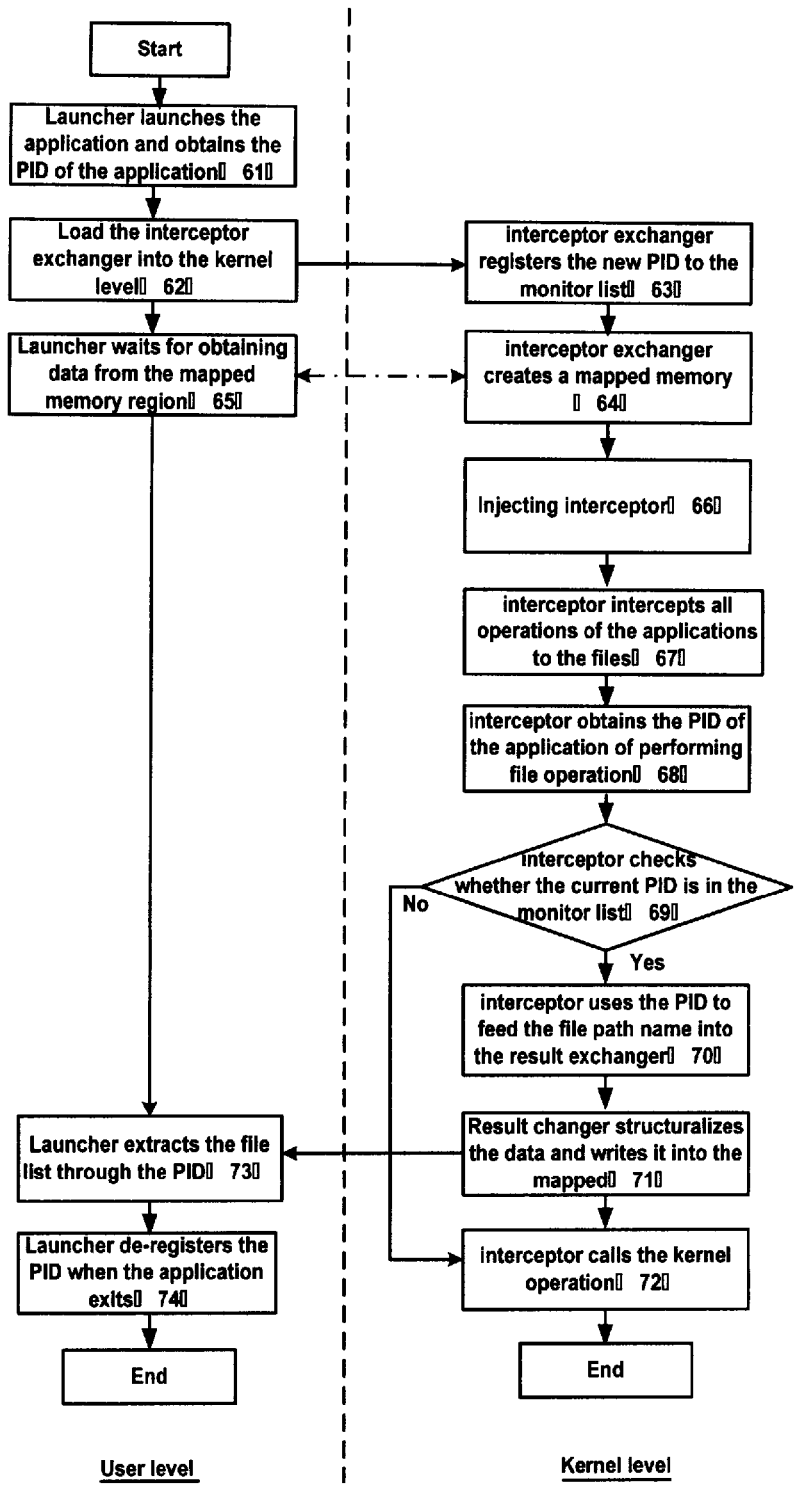
FIG. 5 shows a flow diagram of a CFL tracker performing operation on Windows OS according to an embodiment of the present invention.

FIG. 5 schematically shows a flow diagram of a CFL tracker performing operation on Windows OS according to an embodiment of the present invention. Similar to FIG. 4, to better understand the present invention, the operation is likewise divided into an operation flow in the user level and an operation flow in the kernel level in the figure. At step 61 in the user level at the left side, the Launcher module assists to launch an application. After the Launcher module starts the application, the PID of the application is obtained and made to keep waiting (that is, interrupting the application running). Then at step 62, the Launcher module triggers the Interceptor exchanger, that is, loading the Interceptor exchanger in the kernel level and initializing as a file filter driver. The loading operation is only performed the first time using the Interceptor exchanger. Then entering the kernel level, at step 63, the Interceptor exchanger registers the PID of the process related to the application process to the monitor list.

The flow proceeds to step 64, at which step the Interceptor exchanger creates a mapped memory in the kernel level. The mapped memory is dedicated to store the data exchanged between the result exchanger and the Launcher module. The Launcher module, after the Interceptor exchanger creates the mapped memory, will use the poll ( ) function to wait here for obtaining data, as shown at step 65 on the left side flow diagram. At step 66, the Interceptor is likewise injected, which is different from the Linux platform in that, in the Windows platform, the Interceptor can be implemented as a callback function called by IRP_MJ_CREATE. At step 67, the Interceptor likewise intercepts the open, read or write operations of all applications on the configuration files. Next at step 68, the Interceptor obtains the PID of the application, which is currently to perform the above operations through calling the GetCurrentProcessId( ) function. At step 69, the Interceptor compares the currently obtained PID with the PID in the previous monitor list. If the PID currently obtained by the Interceptor is present in the monitor list, then at step 70, the Interceptor feeds the file path name (that is, the path name of the files subject to the open, read and write operations performed by the process) into a result exchanger with the PID. At step 71, the result exchanger structuralizes the data, and writes the structuralized data into a mapped memory.

At step 72, the Interceptor calls kernel operations to perform the open, read or write operations to the configuration files. If at step 69, the Interceptor, after comparing the currently obtained PID with the PID in the previous monitor list, finds that the PID is not in the list required for monitoring, then the flow directly proceeds to step 72, where the Interceptor calls the kernel operation to implement the open, read or write operations to the configuration files of the application. At step 73, at the left side of the flow diagram, the Launcher module extracts the data written by the result exchanger from the mapped memory through the PID, that is, the configuration file list to be operated. After the extraction, alternatively the data in the mapped memory will be cleared. At step 74, the Launcher module de-registers the PID of the application when the application exits.

Figure 6:
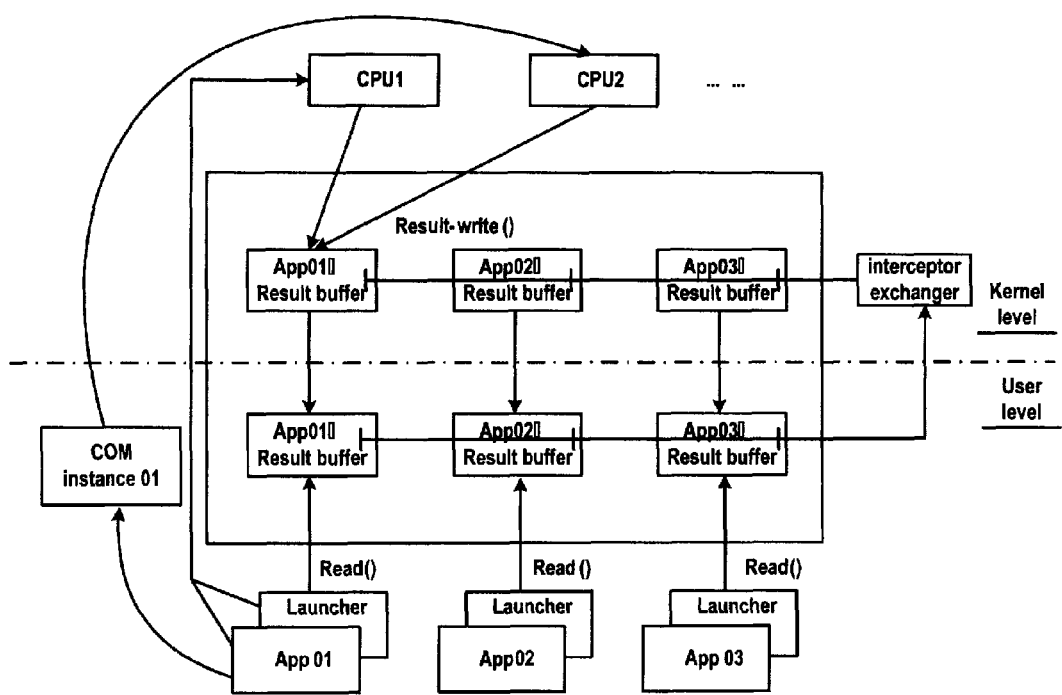
FIG. 6 shows an architecture diagram of transmitting a kernel level data to a user level according to an embodiment of the present invention.

FIG. 6 schematically shows an architecture diagram of transmitting kernel level data to user level according to an embodiment of the present invention. As previously described, in the current operating system architecture, the system is typically divided into a kernel level and a user level, whereas when the data throughput is large, it is required to solve the problem of how to effectively implement data exchange between the kernel level and the user level. For the present invention, in order to efficiently and quickly transmit the configuration file list data collected by the result exchanger to the Launcher module in the user level to thereby feed the result into the file filter of the VCR manager, the exemplary embodiment of the present invention provides that by performing a device I/O (input/output) control to the Interceptor exchanger. The relevant configuration file obtained for each application (for example, the applications App01, App02 and App03 as shown in the figure) in the kernel level can be assigned with a buffer (that is, the relay and mapped memories as previously mentioned). CPU1 and CPU2 write all relevant configuration file list data of each application (for example the application App01 in the figure) into the respective buffer. At the same time, in the user level, relevant configuration file list for each application is also correspondingly assigned with a buffer. By means of memory mapping, the kernel level buffer and the user level buffer of each application are correlated to each other.

When the kernel level buffer stores an application result, namely the concerned configuration file list data, by means of the above mentioned buffer mapping, the result can be directly fed into respective application buffer in the user level. By calling the Read ( ) function, the Launcher module can read the configuration file list data and transmit it to the file filter as shown in the system architecture diagram. In principle, the above operations are to organize data deposits according to processes. After generating data in the kernel level, the generated data is deposited according to different process classifications, such that the data read program can directly read the data of a specific process in the user level, which facilitates processing the user level data. It should be noted that though FIG. 6 shows the buffer respectively in the kernel level and the user level, those skilled in the art would appreciate that the division of buffers in the kernel level and user level here is only in the logical sense, which may physically occupy the same space in the memory.

Figure 7:
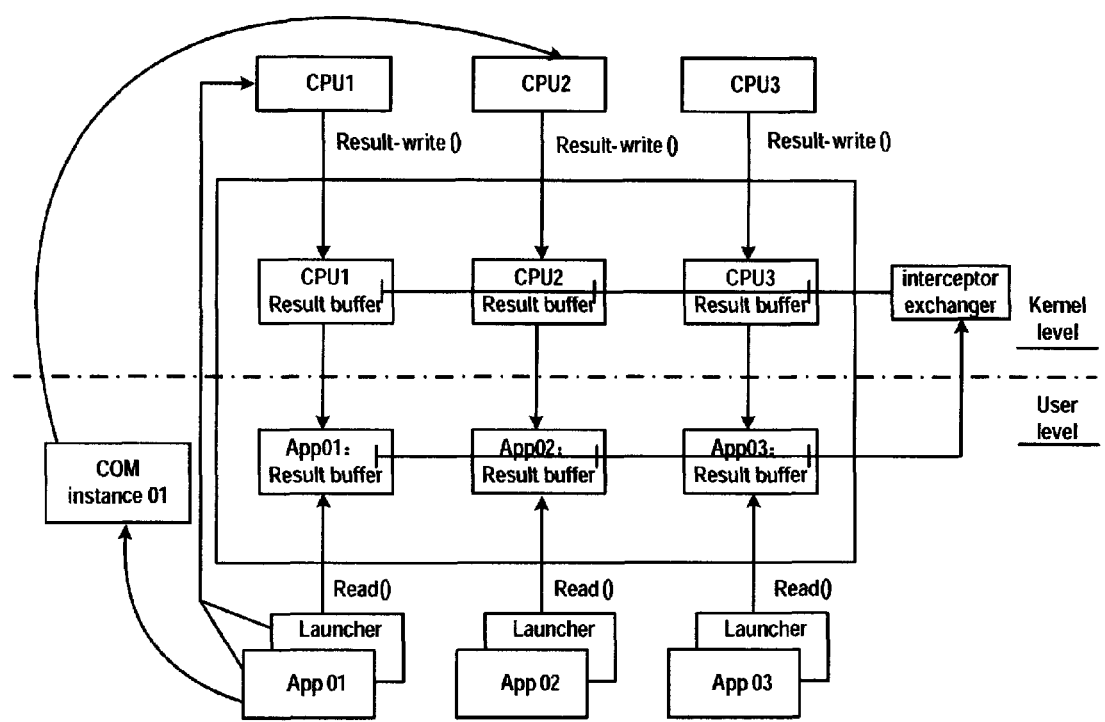
FIG. 7 shows an architecture diagram of transmitting a kernel level data to a user level according to another embodiment of the present invention.

FIG. 7 schematically shows an architecture diagram of transmitting kernel level data to user level data according to an embodiment of the present invention. In the present embodiment, likewise by performing the device I/O (input/output) control to the Interceptor exchanger, different central processing units (CPU) are respectively assigned with their own result buffer (that is, buffers for storing configuration file list data relevant to an application running on the CPU). For example, in the kernel level, a CPU1 result buffer is assigned to CPU1 and a CPU2 result buffer is assigned to CPU2, whereas a CPU3 buffer result is assigned to CPU3. Likewise, the corresponding result buffers are also assigned in the user level and the respective corresponding result buffers are correlated by means of buffer mapping. In principle, the above operation of the present embodiment is to organize data deposits in accordance with the processors, where each central processing unit has its own exclusive memory buffer.

All data generated on the processor (for example relevant configuration file list data in the present invention) are deposited in the memory buffer. After the application reads the data in the user level, the data is classified in dependence of the processes to which they belong. Because at any time each central processing unit has only one running thread, there would be no competition in writing data when storing the data in the kernel level, which is convenient for storing data in the kernel level.

Figure 8:
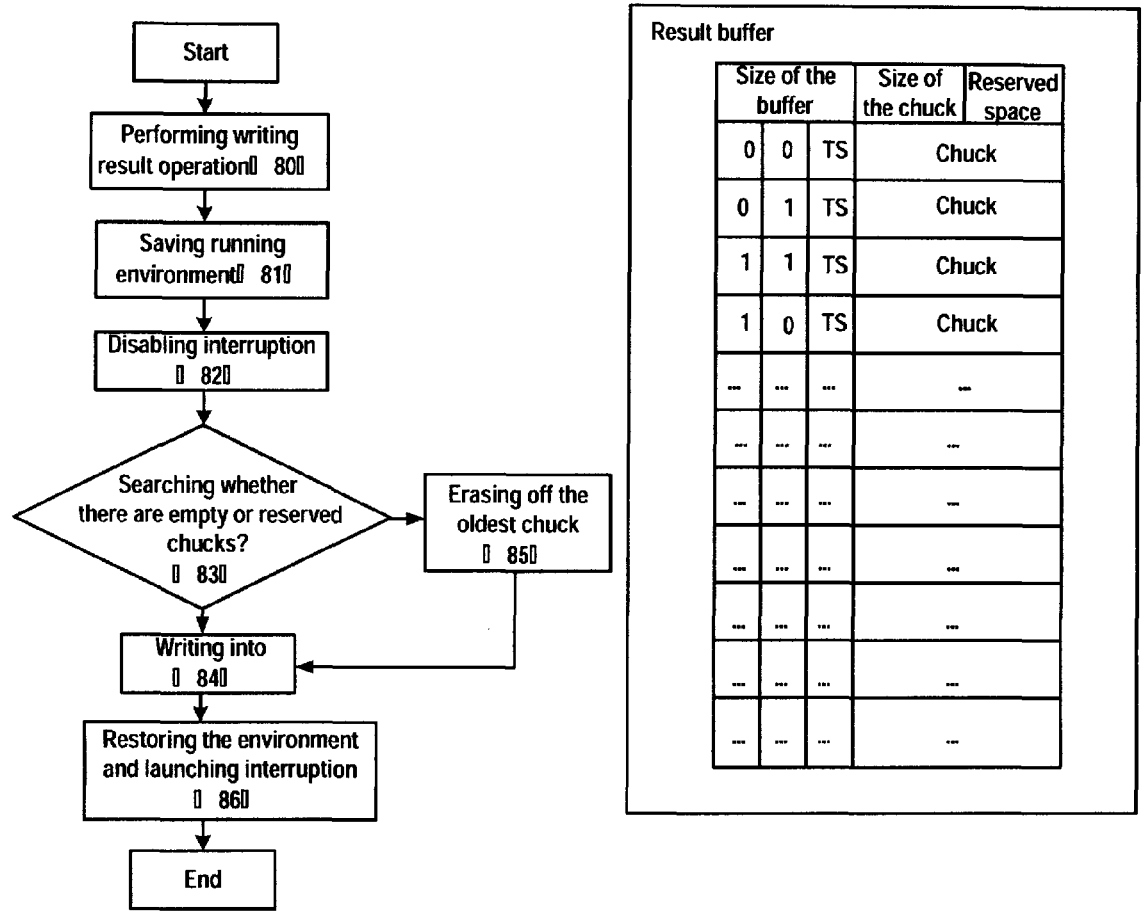
FIG. 8 shows an operation flow diagram of feeding configuration file data collected in the kernel level into the user level with reference to the arrangement of buffers.

FIG. 8 shows an operation flow diagram of feeding configuration file list data collected in the kernel level into the user level with reference to the arrangement of buffers. As shown in the figure, in order to facilitate storing data obtained from the kernel level, according to an embodiment of the present invention, total size of the buffer, sizes of chucks divided in the buffer and the reserved spaces are recorded at the start of the result buffer. Then, the remaining memory area is divided into a plurality of chucks, the start of each chuck including the respective identification field, as shown at the right side of the block diagram of FIG. 8. Preferably, the present invention uses three fields to identify each chuck, wherein the first two fields are combined to indicate the state of the chuck. For example, 00 indicates that the chuck is empty, namely data can be written thereinto, 01 indicates that the chuck is being written into and other write/read operation will be forbidden, 11 indicates that the chuck is in a transitional state, which will be changed into the next state (for example 10 or 01 state, dependent on the specific memory operation), and 10 indicates that the data has been ready and written. The third field indicates a short timestamp indication bit (TS), for representing the time of writing data into the chuck.

Hereinafter, the memory flow diagram at the left side of FIG. 8 is described. At step 80, the result exchanger is ready to write data into a buffer in the kernel level, for example the obtained application-related configuration file list data. At step 81, the result exchanger saves the current application running environment. At step 82, Interrupt Request (IRQ) is disabled (that is, masked) for avoiding interruption from the IRQ when writing data. At step 83, an empty chuck or reserved chuck is searched, for example searching the above three indication bit fields. If the empty chuck is found, at step 84, the data is written into the empty chuck, for example storing the configuration file list found in the present invention in the empty chuck. If no empty chuck is found, at step 85, the oldest chuck among a plurality of chucks is erased such that new data is written into the chuck at step 84, and the oldest chuck can be determined by the above mentioned short timestamp indication bit (TS). After writing data, at step 86, the CPU restores the saved running environment and re-opens the previously disabled IRQ for the process to perform the subsequent operations, for example, the Launcher module inquires the chuck indication field, reads out the ready data and clears the empty buffer at a proper time.

Figure 9:
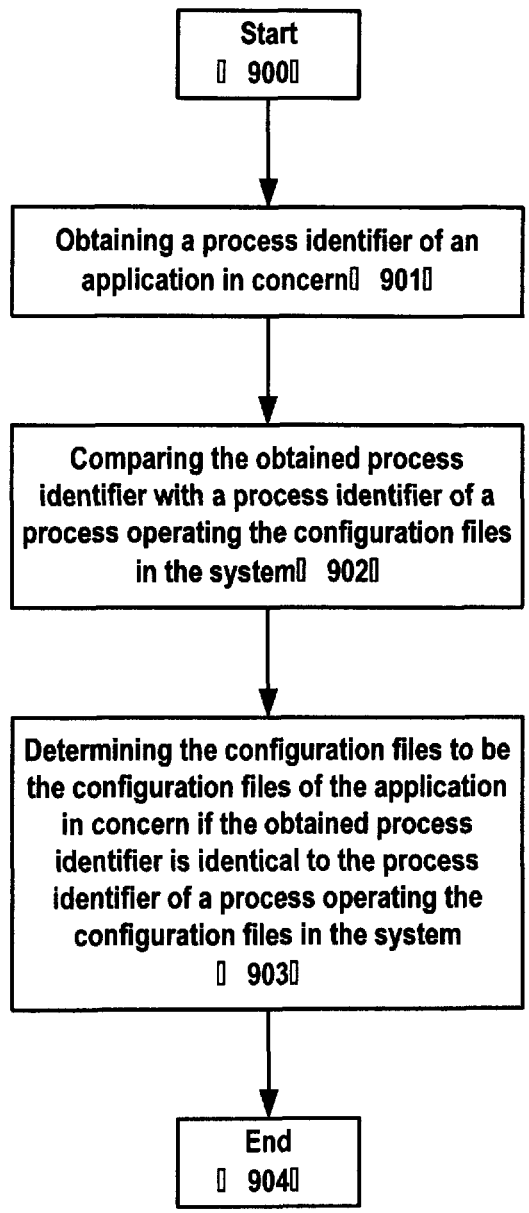
FIG. 9 shows a flow diagram of a method for automatically discovering application configuration files in a system according to an embodiment of the present invention.

FIG. 9 schematically shows a flow diagram of a method for automatically discovering an application configuration file in a system according to an embodiment of the present invention. As described in accordance with FIG. 1(*a*) and FIG. 1(*b*), according to the most basic embodiment of the present invention, the process identifier of the concerned application is obtained at step 901. At step 902, the obtained process identifier is compared with the process identifier of the process for operating the configuration files in the system. Next at step 903, when the obtained process identifier is identical to the process identifier of the process for operating the configuration files in the system, it is determined that the configuration files are the configuration files of the application in concern.

The process identifier of the process in communication with the application, that is, the communication process identifier, may be further obtained. By capturing the correlation between processes, for example sharing the same document, having a pipe there between, exchanging data through a message, or having call relationship, it can be deemed that the two processes have communication. In particular, in the Windows OS, the communication process identifier is obtained through a COM manager. The obtained communication process identifier is compared with the process identifier of the process for operating the configuration files in the system, where if the obtained communication process identifier is identical to the process identifier of the process for operating the configuration files in the system, the configuration files are also the configuration files of the application in concern.

Figure 10:
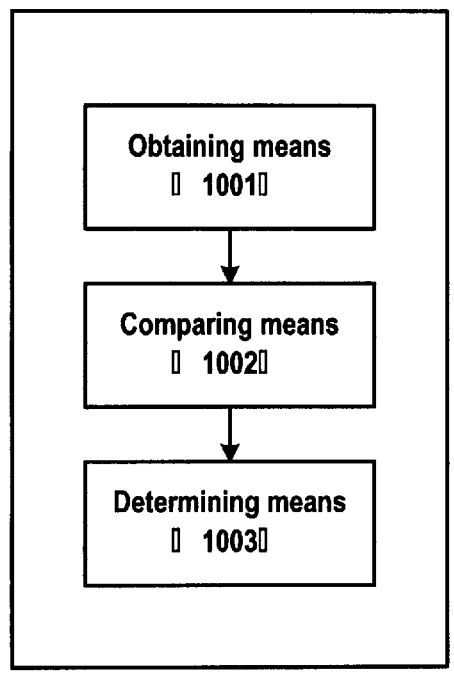
FIG. 10 shows a block diagram of an apparatus for automatically discovering application configuration files in a system according to an embodiment of the present invention.

FIG. 10 schematically shows a block diagram of an apparatus for automatically discovering application configuration files in a system according to an embodiment of the present invention. As shown in the figure, the apparatus includes obtaining means 1001, comparing means 1002 and determining means 1003. In the apparatus, the obtaining means 1001 is for obtaining the process identifier of the application in concern. The comparing means 1002 is for comparing the obtained process identifier with the process identifier of the process for operating the configuration files in the system. The determining means 1003 is for determining the configuration files to be the configuration files of the application in concern if the obtained communication process identifier is identical to the process identifier of the process for operating the configuration files in the system.

The embodiments of the present invention can be implemented by hardware, software, firmware or a combination thereof. Those skilled in the art should be aware that the present invention can also be embodied in a computer program product set on a signal bearing medium available for any suitable data processing system. This kind of signal bearing medium may be a transmission medium or a recordable medium with machine-readable information, including magnetic medium, optical medium, or other suitable medium. The examples of the readable medium include: magnetic disk of floppy disk in a hard disk driver, a CD or magnetic tape for a CD driver, and other medium conceivable by those skilled in the art. The skilled in the art should appreciate that any communication terminal having a suitable programming device is capable of implementing the steps of the method of the present invention embodied in a program product.

It should be noted that the above description omits some more specific technical details which may be well-known to those skilled in the art and essential for implementing the present invention for the purpose of easy understanding.

The description of the present invention has been presented for the purposes of illustration and description, and is not intended to be exhaustive or limited to the invention in the form disclosed. Many modifications and variations will be apparent to those of ordinary skilled in the art.

Thus, selecting and describing the preferred embodiments is intended for better explaining the principle and practical application of the present invention, and enabling those of normal skill in the art to understand that, under the precondition of not departing from the essence of the present invention, all variations and modifications fall within the scope of the present invention as defined by the claims.

What is claimed is:

1. A method for discovering application configuration files in a system, comprising steps of:
   obtaining a process identifier assigned by the system of an application in concern running in the system;
   accessing a communication distance threshold that indicates a degree of relevance as to whether the application in concern communicates directly to other processes or indirectly through an intermediate process to other processes;
   based on the communication distance threshold indicating that the application in concern communicates within the distance threshold with other processes
      registering process identifiers assigned by the system for processes in the system that match the communication distance threshold;
      monitoring application configuration files in the system accessed by process identifier assigned by the system to each of the processes where at least some of the processes are in communication with the process of the application in concern;
      comparing the obtained process identifier with each of the process identifiers of at least some processes that operating access the respective configuration files in the system; and
      determining one of the configuration files in the system to be the one of the configuration files of the application in concern, when the obtained process identifier is identical to the process identifier of one of the at least some processes accessing the one of the configuration files in the system.

2. The method according to claim 1, wherein the configuration files comprise one of an open operation, a read operation or a write operation to the configuration files.

3. The method according to claim 1, wherein the system is Windows OS, and the step of obtaining the process identifier of the process communicating with the application in concern comprises: using a communication ICOM) manager to obtain a process identifier of a communication ICOM) instance related to the application in concern, as the process identifier.

4. The method according to claim 1, further comprising comparing the configuration files of the application in concern with configuration files subject to write operation in the system, to determine changed configuration files in the configuration files of the application in concern.

5. The method according to claim 4, wherein after determining the changed configuration files, the changed configuration files are subject to version control operation.

6. The method according to claim 4, wherein the configuration files of the application in concern are transmitted from a kernel level of the system to a user level of the system for comparison.

7. The method according to claim 6, further comprising assigning corresponding buffer for storing the configuration files respectively to a plurality of applications in concern in the kernel level and user level of the system.

8. The method according to claim 6, further comprising assigning the corresponding buffer for storing relevant configuration files to each central processing unit for running a plurality of applications in the kernel level of the system, whereas the corresponding buffer is assigned to each application in concern in the user level of the system.

9. An apparatus for discovering application configuration files in a system, comprising:
   a memory;
   a processor communicatively coupled to the memory for performing;
      obtaining a process identifier assigned by the system of an application in concern running in the system;
      accessing a communication distance threshold that indicates a degree of relevance as to whether the application in concern communicates directly to other processes or indirectly through an intermediate process to other processes;
      based on the communication distance threshold indicating that the application in concern communicates within the distance threshold with other processes
         registering process identifiers assigned by the system for processes in the system that match the communication distance threshold;
         monitoring application configuration files in the system accessed by process identifier assigned by the system to each of the processes where at least some of the processes are in communication with the process of the application in concern;
         comparing the obtained process identifier with each of the process identifiers of at least some processes that operating access the respective configuration files in the system; and
         determining one of the configuration files in the system to be the one of the configuration files of the application in concern, when the obtained process identifier is identical to the process identifier of one of the at least some processes accessing the one of the configuration files in the system.

10. The system according to claim 9, wherein the configuration files comprise one of an open operation, a read operation or a write operation to the configuration files.

11. The system according to claim 9, wherein the system is Windows OS, and the step of obtaining the process identifier of the process communicating with the application in concern comprises: using a communication ICOM) manager to obtain a process identifier of a communication ICOM) instance related to the application in concern, as the process identifier.

12. The system according to claim 9, further comprising comparing the configuration files of the application in concern with configuration files subject to write operation in the system, to determine changed configuration files in the configuration files of the application in concern.

13. The system according to claim 12, wherein after determining the changed configuration files, the changed configuration files are subject to version control operation.

14. The system according to claim 12, wherein the configuration files of the application in concern are transmitted from a kernel level of the system to a user level of the system for comparison.

15. The system according to claim 14, further comprising assigning corresponding buffer for storing the configuration files respectively to a plurality of applications in concern in the kernel level and user level of the system.

16. The system according to claim 14, further comprising assigning the corresponding buffer for storing relevant configuration files to each central processing unit for running a plurality of applications in the kernel level of the system, whereas the corresponding buffer is assigned to each application in concern in the user level of the system.

17. A non-transitory machine readable medium encoded with a program for discovering application configuration files in a system, the program comprising instructions for:
   obtaining a process identifier assigned by the system of an application in concern running in the system;
   accessing a communication distance threshold that indicates a degree of relevance as to whether the application in concern communicates directly to other processes or indirectly through an intermediate process to other processes;

based on the communication distance threshold indicating that the application in concern communicates within the distance threshold with other processes registering process identifiers assigned by the system for processes in the system that match the communication distance threshold;

monitoring application configuration files in the system accessed by process identifier assigned by the system to each of the processes where at least some of the processes are in communication with the process of the application in concern;

comparing the obtained process identifier with each of the process identifiers of at least some processes that operating access the respective configuration files in the system; and determining one of the configuration files in the system to be the one of the configuration files of the application in concern, when the obtained process identifier is identical to the process identifier of one of the at least some processes accessing the one of the configuration files in the system.

18. The non-transitory machine readable medium according to claim 17, wherein the configuration files comprise one of an open operation, a read operation or a write operation to the configuration files.

19. The non-transitory machine readable medium according to claim 17, wherein the system is Windows OS, and the step of obtaining the process identifier of the process communicating with the application in concern comprises: using a communication ICOM) manager to obtain a process identifier of a communication ICOM) instance related to the application in concern, as the process identifier.

20. The non-transitory machine readable medium according to claim 17, further comprising comparing the configuration files of the application in concern with configuration files subject to write operation in the system, to determine changed configuration files in the configuration files of the application in concern.

* * * * *